(12) United States Patent
Ramesh

(10) Patent No.: US 9,370,825 B2
(45) Date of Patent: Jun. 21, 2016

(54) INDEXABLE DRILL INSERT

(75) Inventor: Karthic Ramesh, Bangalore (IN)

(73) Assignee: KENNAMETAL INDIA LIMITED, Bangalore (IN)

( * ) Notice: Subject to any disclaimer, the term of this patent is extended or adjusted under 35 U.S.C. 154(b) by 340 days.

(21) Appl. No.: 14/233,802

(22) PCT Filed: Jul. 13, 2012

(86) PCT No.: PCT/US2012/046576
§ 371 (c)(1),
(2), (4) Date: Jan. 20, 2014

(87) PCT Pub. No.: WO2013/016018
PCT Pub. Date: Jan. 31, 2013

(65) Prior Publication Data
US 2014/0161552 A1    Jun. 12, 2014

(30) Foreign Application Priority Data

Jul. 22, 2011 (IN) .......................... 2516/CHE/2011

(51) Int. Cl.
*B23B 51/02* (2006.01)
*B23B 27/16* (2006.01)
(Continued)

(52) U.S. Cl.
CPC ........... *B23B 27/1611* (2013.01); *B23B 27/141* (2013.01); *B23B 51/048* (2013.01);
(Continued)

(58) Field of Classification Search
CPC .............. B23B 51/048; B23B 2251/50; B23B 2200/0471; B23B 2200/125; B23B 2200/201; B23B 2200/204; Y10T 408/905
See application file for complete search history.

(56) References Cited

U.S. PATENT DOCUMENTS 3,497,933 A    3/1970 Okada
4,072,438 A    2/1978 Powers
(Continued)

FOREIGN PATENT DOCUMENTS

CN    1110051 C    5/2003
CN    1655899 A    8/2005
(Continued)

OTHER PUBLICATIONS

European Patent Office, "extended European search report for application No. EP 12 81 7536", dated Feb. 13, 2015, 6 pp.
(Continued)

*Primary Examiner* — Sunil K Singh
*Assistant Examiner* — Ryan Rufo
(74) *Attorney, Agent, or Firm* — Larry R. Meenan

(57) ABSTRACT

The present disclosure provides a quadrangular indexable drill insert comprising a substantially flat top surface and bottom surface, a side surface adjoining the top and bottom surfaces; four identical cutting edges formed at intersection of side surface and top surface, each cutting edge comprising, a concave curved part edge of predetermined radius at corner of the insert; a first part edge oriented towards axis of drill body and is having negative slope, said first part edge is connected to the concave curved part edge through a nose portion; a second part edge connected to first part edge through a transitional edge, said second part edge is tangentially oriented to an imaginary inscribed circle; a third part edge connected to the second part edge through a transitional edge, and a nose portion of adjoining the third part edge with concave curved part edge of succeeding cutting edge.

16 Claims, 8 Drawing Sheets

(51) Int. Cl.
*B23B 51/04* (2006.01)
*B23B 27/14* (2006.01)

(52) U.S. Cl.
CPC ... *B23B2200/0471* (2013.01); *B23B 2200/125* (2013.01); *B23B 2200/201* (2013.01); *B23B 2200/204* (2013.01); *B23B 2251/50* (2013.01); *Y10T 408/89* (2015.01); *Y10T 408/905* (2015.01); *Y10T 408/9098* (2015.01)

(56) References Cited

U.S. PATENT DOCUMENTS

| | | | |
|---|---|---|---|
| 4,087,917 A | 5/1978 | Sheerer | |
| 4,115,024 A | 9/1978 | Sussmuth | |
| 4,131,383 A | 12/1978 | Powers | |
| 4,189,265 A | 2/1980 | Arnold | |
| 4,194,862 A | 3/1980 | Zweekly | |
| 4,475,851 A | 10/1984 | Hale | |
| 4,507,024 A | 3/1985 | Stashko | |
| 4,606,679 A | 8/1986 | Jeremias | |
| 4,648,760 A | 3/1987 | Karlsson | |
| 4,859,123 A * | 8/1989 | Koesashi | B23B 51/048 408/227 |
| 4,889,455 A | 12/1989 | Karlsson | |
| 4,915,548 A | 4/1990 | Fouquer | |
| 4,966,500 A | 10/1990 | Tsujimura | |
| 4,990,036 A * | 2/1991 | Eklund | B23B 27/141 407/113 |
| 5,032,049 A | 7/1991 | Hessman | |
| 5,158,402 A | 10/1992 | Satran et al. | |
| 5,221,164 A | 6/1993 | Allaire | |
| 5,232,319 A | 8/1993 | Satran et al. | |
| 5,302,060 A | 4/1994 | Nystrom | |
| 5,340,246 A | 8/1994 | Tukala | |
| 5,437,522 A | 8/1995 | Satran et al. | |
| 5,486,073 A | 1/1996 | Satran | |
| 5,509,761 A | 4/1996 | Grossman | |
| 5,593,255 A | 1/1997 | Satran | |
| 5,597,271 A | 1/1997 | Men | |
| 5,709,509 A | 1/1998 | Wegener et al. | |
| 5,720,583 A | 2/1998 | Bohnet | |
| 5,727,919 A | 3/1998 | Heumann et al. | |
| 5,807,031 A | 9/1998 | Arai | |
| 5,895,179 A | 4/1999 | Gschwend | |
| 5,947,650 A | 9/1999 | Satran | |
| 5,957,635 A | 9/1999 | Nuzzi | |
| 5,971,672 A | 10/1999 | Hansson | |
| 5,975,812 A | 11/1999 | Friedman | |
| 6,019,553 A | 2/2000 | Yakamavich, Jr. | |
| 6,039,515 A | 3/2000 | Lamberg | |
| 6,200,077 B1 | 3/2001 | Svenningsson et al. | |
| 6,224,300 B1 | 5/2001 | Baxivanelis | |
| 6,257,807 B1 | 7/2001 | Heinloth | |
| 6,336,776 B1 | 1/2002 | Noggle | |
| 6,527,486 B2 | 3/2003 | Wiman et al. | |
| 6,543,970 B1 | 4/2003 | Qvarth | |
| 6,712,563 B2 | 3/2004 | Maier | |
| 6,733,212 B2 | 5/2004 | Nagaya et al. | |
| 6,783,306 B2 | 8/2004 | Popke | |
| 6,929,432 B2 | 8/2005 | Roman | |
| 6,948,891 B2 | 9/2005 | Roman | |
| 7,121,772 B2 | 10/2006 | Krahula | |
| 7,175,370 B2 | 2/2007 | Scherbarth | |
| 7,192,224 B2 | 3/2007 | Fritsch | |
| 7,341,408 B2 | 3/2008 | Kratz | |
| 7,351,017 B2 | 4/2008 | Kruszynski et al. | |
| 7,374,372 B2 | 5/2008 | Rofner | |
| 7,431,540 B2 | 10/2008 | Läf | |
| 7,438,508 B2 | 10/2008 | Alm | |
| 7,513,717 B2 | 4/2009 | Engstrom | |
| 7,677,845 B2 | 3/2010 | Limell | |
| 7,695,221 B2 | 4/2010 | Kruszynski | |
| 7,758,287 B2 | 7/2010 | Alm | |
| 7,837,417 B2 | 11/2010 | Blomstedt | |
| 7,857,555 B2 | 12/2010 | Wermeister | |
| 7,905,687 B2 | 3/2011 | Dufour | |
| 7,909,546 B2 | 3/2011 | Nada et al. | |
| 7,922,427 B2 | 4/2011 | Spitzenberger et al. | |
| 7,972,091 B2 | 7/2011 | Svenningsson | |
| 8,157,489 B2 | 4/2012 | Wolf et al. | |
| 8,192,113 B2 | 6/2012 | Limell | |
| 8,197,163 B2 | 6/2012 | Nasu | |
| 2002/0061235 A1 | 5/2002 | Maier | |
| 2003/0223832 A1 | 12/2003 | Roman et al. | |
| 2003/0223833 A1 | 12/2003 | Roman | |
| 2005/0111928 A1 | 5/2005 | Stanarius et al. | |
| 2007/0160433 A1 | 7/2007 | Lee | |
| 2007/0201962 A1 | 8/2007 | Limell | |
| 2008/0226403 A1 | 9/2008 | Craig | |
| 2009/0071723 A1 | 3/2009 | Mergenthaler | |
| 2009/0238649 A1 | 9/2009 | Kruszynski | |
| 2010/0129167 A1 * | 5/2010 | Morrison | B23B 27/141 407/114 |
| 2010/0178122 A1 | 7/2010 | Bae | |
| 2010/0209203 A1 | 8/2010 | Cao | |
| 2010/0272526 A1 * | 10/2010 | Dufour | B23B 27/141 407/114 |
| 2010/0329804 A1 | 12/2010 | Okumura | |
| 2012/0027530 A1 | 2/2012 | Agic | |
| 2014/0212235 A1 | 7/2014 | Prast | |

FOREIGN PATENT DOCUMENTS

| | | |
|---|---|---|
| CN | 1251327 C | 4/2006 |
| CN | 101011754 A | 8/2007 |
| CN | 100571943 C | 12/2009 |
| CN | 101234432 B | 11/2011 |
| CN | 101668604 B | 2/2012 |
| CN | 101720265 B | 2/2012 |
| CN | 102361719 A | 2/2012 |
| CN | 101437640 B | 3/2012 |
| CN | 101909795 B | 5/2012 |
| CN | 101152671 B | 5/2013 |
| DE | 102006044605 A1 | 3/2008 |
| EP | 1 813 368 A2 | 8/2007 |
| EP | 1 902 799 A2 | 3/2008 |
| JP | 59196107 A | 11/1984 |
| JP | 10180519 A | 7/1998 |
| JP | 2000061719 A | 2/2000 |
| JP | 2003094222 A | 4/2003 |
| JP | 2008183703 A | 8/2008 |
| JP | 2008207283 A | 9/2008 |
| JP | 2009262277 A | 11/2009 |
| JP | 2009262319 A | 11/2009 |
| KR | 1020050007569 A | 1/2005 |
| WO | 93/13899 A1 | 7/1993 |
| WO | 03/099494 A1 | 12/2003 |
| WO | 03/099495 A1 | 12/2003 |
| WO | 2008/153233 A1 | 12/2008 |
| WO | WO2008153233 A1 | 12/2008 |
| WO | WO2011111197 A1 | 9/2011 |
| WO | 2014116571 | 7/2014 |

OTHER PUBLICATIONS

Apr. 1, 2015 Final Office Action US 2013-0022423 A1.
Apr. 10, 2015 Office action (3 months) 1 US20130315684.
Jun. 8, 2015 Final Office Action 20130022422.
Jul. 22, 2015 First office action 103702789.
K-04012-US-NP Advisory Action.
Feb. 13, 2015 European Search Report.
Sep. 25, 2015—First Office Action—K-04012-CN-NP2.
Sep. 29, 2015—First Office Action—K-04012-CN-NP.
USPTO, "First Office Action for U.S. Appl. No. 13/552,964", dated Jan. 13, 2015, 29 pp.
CN 102886551A, Oct. 30, 2015 First office action CN 102886551A.
Nov. 12, 2014—K-4014INUS1—Non-Final_Rejection-1.
JP_2000061719_A_translation, obtained at http://dossier2.ipdl.inpit.go.jp/JP/application/P/1999-229114/13.08.1999_Description_59900785880.htm.
PCT/US2014/012282.

* cited by examiner

INDEXABLE DRILL INSERT

TECHNICAL FIELD

Embodiments of the present disclosure relate to a drill insert, more particularly embodiments relate to a quadrangular indexable drill insert for centre pocket of the drill body.

BACKGROUND OF DISCLOSURE

Drilling tools are used to drill cylindrical holes in metallic workpieces. The cutting or boring action of the drill tools may be carried out by an elongated, substantially cylindrical drilling tool, such as a combination of a tool holder and a drill insert, which is selectively attached thereto. Such an arrangement may then be used in an application wherein one end of the tool holder is securely mounted in a driving apparatus, which rotates the holder about its longitudinal axis. At the opposite end of the elongated tool holder, the cutting insert engages the material to be cut. Alternatively, the workpiece may be made to rotate relative to the holder and cutting insert, such as in positioning the holder in the tail stock of a lathe or the like. Further, the tool and workpiece may be made to rotate relative to one another. The use of cutting inserts allows for quick changing of the insert upon wear of the cutting surfaces instead of the entire tool, and allows for one tool to be used for a variety of different boring applications by simply changing the insert and not the entire drill assembly.

The indexable drill inserts plays a very important role in drilling because all the sides of insert can be used for cutting one after the other. Further, use of inserts will reduce the manufacturing lead time and assembling time.

The use of quadra angular indexable drill inserts are known in the art. However, the inserts which are in the art comprises four rectangular cutting edges for cutting the workpiece. The use of rectangular cutting edges makes the drill to drift away from its centre because the forces are acting all over the drill body and not exactly at the centre. The drill drift further creates a narrow wall which is not feasible in practical applications. Further, the conventional indexable drill inserts rub the surface of the drilling hole if the diameter of the drill hole is less than the predetermined value.

Further, when the conventional quadra angular indexable drill inserts are mounted such that portion of the drill insert crosses centre of the drill body it forms reverse cutting operation. During drilling operation corners of the drill insert would chip out due to reverse cutting action.

In the view of above mentioned disadvantages it is necessary to develop a drill insert having four identical cutting edges

SUMMARY OF THE DISCLOSURE

The shortcomings of the prior art are overcome and additional advantages are provided through the provision of drill insert as claimed in the present disclosure.

Additional features and advantages are realized through the techniques of the present disclosure. Other embodiments and aspects of the disclosure are described in detail herein and are considered a part of the claimed disclosure.

The preset disclosure provides a quadrangular indexable drill insert comprising: a substantially flat top surface and bottom surface, a side surface adjoining the top and bottom surfaces to form four sides of the drill insert, the bottom surface is smaller than the top surface to provide positive cutting geometry. Four identical cutting edges formed at intersection of the side surface and the top surface, each cutting edge comprising, a concave curved part edge of predetermined radius at corner of the insert; a first part edge oriented towards axis of the drill body and is having negative slope, wherein said first part edge is connected to the concave curved part edge through a nose portion of predetermined radius making convex curve; a second part edge connected to the first part edge through a transitional edge, said second part edge is tangentially oriented to an imaginary inscribed circle of the insert, wherein said transitional edge makes a concave curve with the first and second part edges; a third part edge connected to the second part edge through a transitional edge, wherein said transitional edge is making a convex curve with said second and third part edges; and a nose portion of predetermined radius adjoining the third part edge with concave curved part edge of succeeding cutting edge. The drill insert also includes a through hole at center of the drill insert extending between the top surface and the bottom surface of the drill insert for mounting the insert with the drill body; and a chamfer provided at bottom edge of the drill insert.

In one embodiment of the present disclosure, said drill insert is mounted at centre pocket of the drill body.

In one embodiment of the present disclosure, the radius of the concave curved part edge ranges from about 0.4 mm to about 10 mm.

In one embodiment of the present disclosure, the first part edge is linear and is inclined at an angle ranging from about 0° to about 5° with respect to horizontal reference axis of the insert.

In one embodiment of the present disclosure, the second and third part edges forms 'V' shape and included angle between the second and third part edges ranges from about 140° to about 179°.

In one embodiment of the present disclosure, the radius of nose portions ranges from about 0.1 mm to about 10 mm.

In one embodiment of the present disclosure, radius of concave shaped transition edge ranges from about 0.1 mm to about 5 mm.

In one embodiment of the present disclosure, radius of the convex shaped transition edge ranges from about 0.1 mm to about 100 mm.

In one embodiment of the present disclosure, the through hole comprises a mouth portion and series of stepped potions for accommodating an insert screw.

In one embodiment of the present disclosure, angle of the chamfer depends on thickness of the drill insert and preferably about 30 degrees with respect to vertical axis of the drill insert.

In one embodiment of the present disclosure, the top surface is provided with a protruded potion around the mouth portion.

In one embodiment of the present disclosure, corners of side surface of the insert makes an angle ranging from about 0 to about 9 degrees with respect to vertical axis of the drill insert to facilitate clearance between insert and the pocket.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING FIGURES

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

To overcome the drawbacks mentioned in the background, a quadra angular indexable drill insert is developed. The drill insert of the present disclosure consists of four identical cutting edges having plurality of part edges which direct the forces to the centre of the drill body, which helps to prevent drifting of drill body from its centre during drilling operation.

Figure 1:
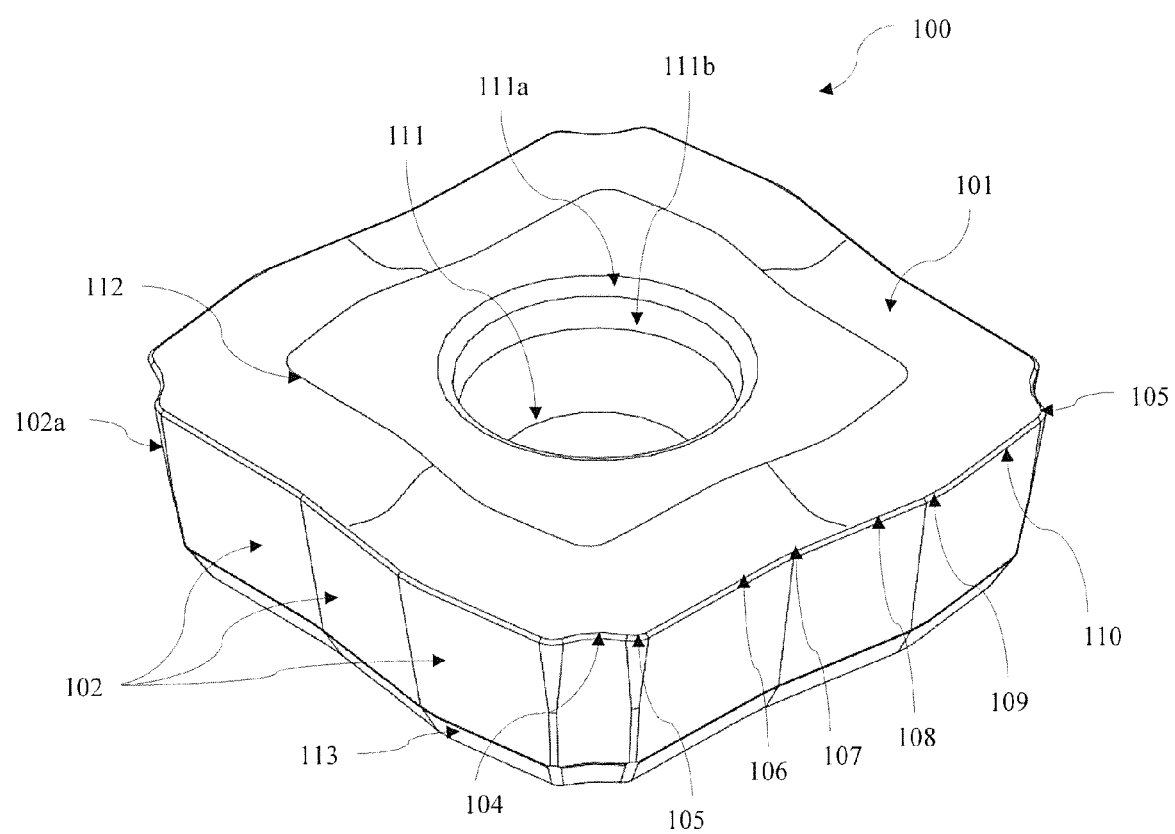
FIG. 1 illustrates a top perspective view of the drill insert of the present disclosure.
Figure 2:
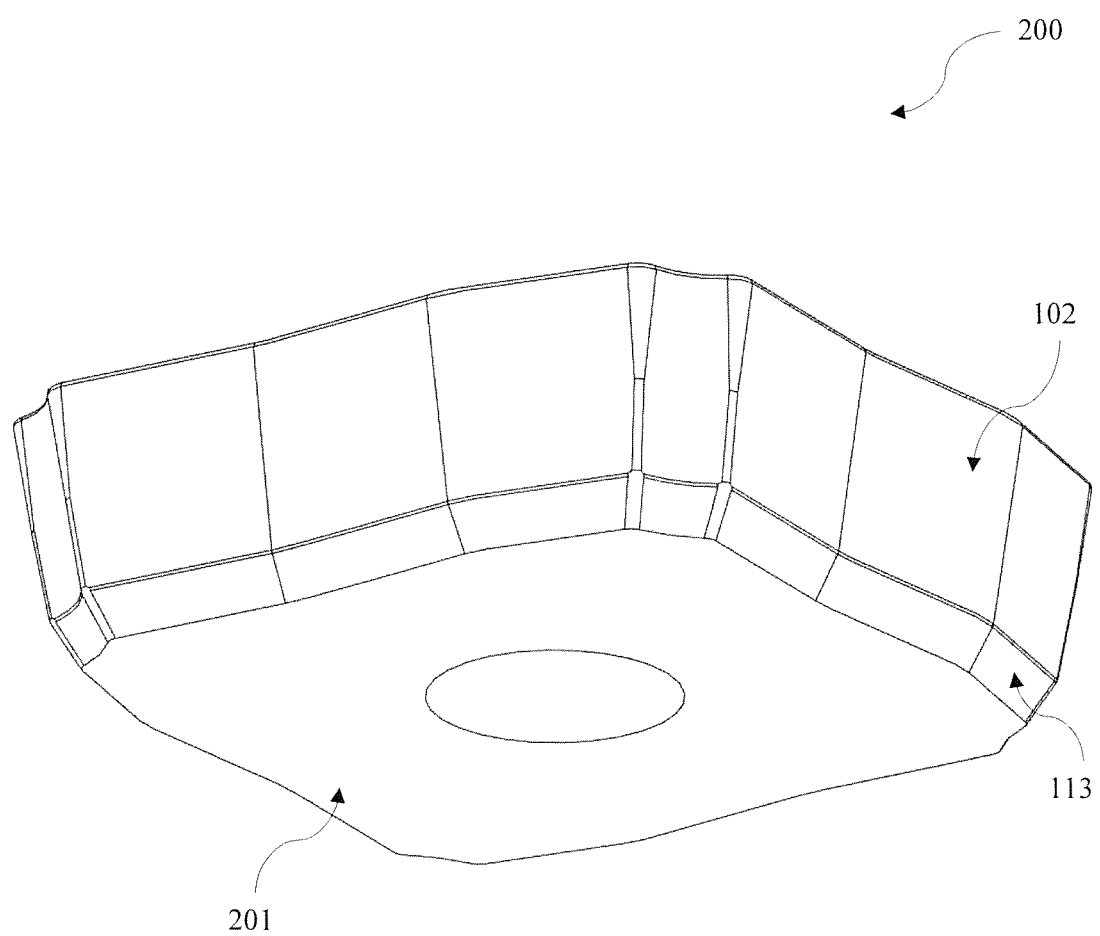
FIG. 2 illustrates a bottom perspective of the drill insert of the present disclosure.

FIG. 1 and FIG. 2 are exemplary embodiments illustrating top and bottom perspective views of the drill insert (100). Said drill insert (100) comprises a top surface (101) and a bottom surface (201) and side surfaces (102) adjoining the top and bottom surfaces (101 and 201). The top surface (101) of the drill insert (100) bigger than the bottom surface (201) to provide positive clearance between the drill insert (100) and a pocket (602) [FIG. 6] in a drill body (502) [FIG. 5]. The four edges of the side surfaces (102) intersecting the top surface (101) from four identical cutting edges (103), each cutting is divided into plurality of part edges (104, 106, 108 and 110) to avoid chipping of the drill insert (100) and to direct the forces t0 drilling axis (504) in order to prevent drifting of the drill body (502) from its centre.

The concave curved part edge (104) of radius ranging from 0.4 mm to 100 mm is provided at four corners (102a) of the drill insert (104). Said concave curved part edge (104) prevents the drill insert (100) from chipping off which happen when the drill insert (100) is positioned such that the portion of the insert (100) crosses the drill centre (504) [FIG. 5] and hence causing reverse cutting action.

The first part edge (106) is joined to the concave curved part edge (104) through nose portion (105) of radius ranging from 0.1 mm to 10 mm. Said nose portion (105) makes convex curve with the first part edge (106) and concave part edge (104). The first part edge (106) is linear and is oriented towards the drill axis (504) with slope being negative. Further, the first part edge (106) makes an angle ranging from about 0° to about 5° preferably about 0.4° with respect to horizontal axis (B-B) of the drill insert (100). The second part edge (108) is connected to the first part edge (106) through a transition edge (107) of radius ranging from about 0.1 mm to about 5 mm which makes concave curve with the first and second part edges (106 and 108). The second part edge (108) is tangentially oriented to an imaginary inscribed circle (301) of the insert (100). The third part edge (110) is connected to the second part edge (108) through a transitional edge (109) of radius ranging from about 0.1 mm to about 10 mm which makes a convex curve with the second and third part edges (108 and 110). The second and third part edges (108 and 110) form an inverted roof shape or a 'V' shape when they are connected by the transition edge (109). The included angle between the second and third part edges (108 and 110) range from about 140° to about 179°. The cutting edge (103) further comprises a corner nose portion (105) of radius ranging from about 0.1 mm to about 10 mm which connects third part edge (110) of the one cutting edge (103) with the concave curved part edge (104) of the subsequent cutting edge (103).

The drill insert (100) further includes a hole (111) extending from top surface (101) to the bottom surface (201) of the drill insert (100) for mounting the insert (100) with the drill body (502). A mouth portion (111a) is provided around the hole (111) on the top surface (101) and a series of stepped potions (111b) provided on circumference of the hole (109) to accommodate the insert screw (601) for mounting the drill insert (100) in the pocket (602) of the drill body (502). In one embodiment, a protruded portion (112) is provided on the top surface (101) of the drill insert (100). Said protruded portion (112) facilitates cutting of the chip coming out of the drilling operation and direct the chip to the helical flute portion (503) of the drill body (502) to facilitate chip vacation.

The side surfaces (102) of the drill inserts (100) include plurality of protruded portions to secure the drill insert inside the pocket (602) of the drill body (502). The protruded portions make contact with the walls of the pocket (602) and arrest the rotational motion of the drill insert (100) inside the pocket (602). Further, corners (102a) of the side surface (102) makes an angle of about 9 degrees with respect to vertical axis (A-A) of the drill insert (100) to facilitate clearance between insert (100) and the pocket (602). This clearance is a primary clearance and helps to remove the insert (100) easily from the pocket (602) of the drill body.

Figure 3:
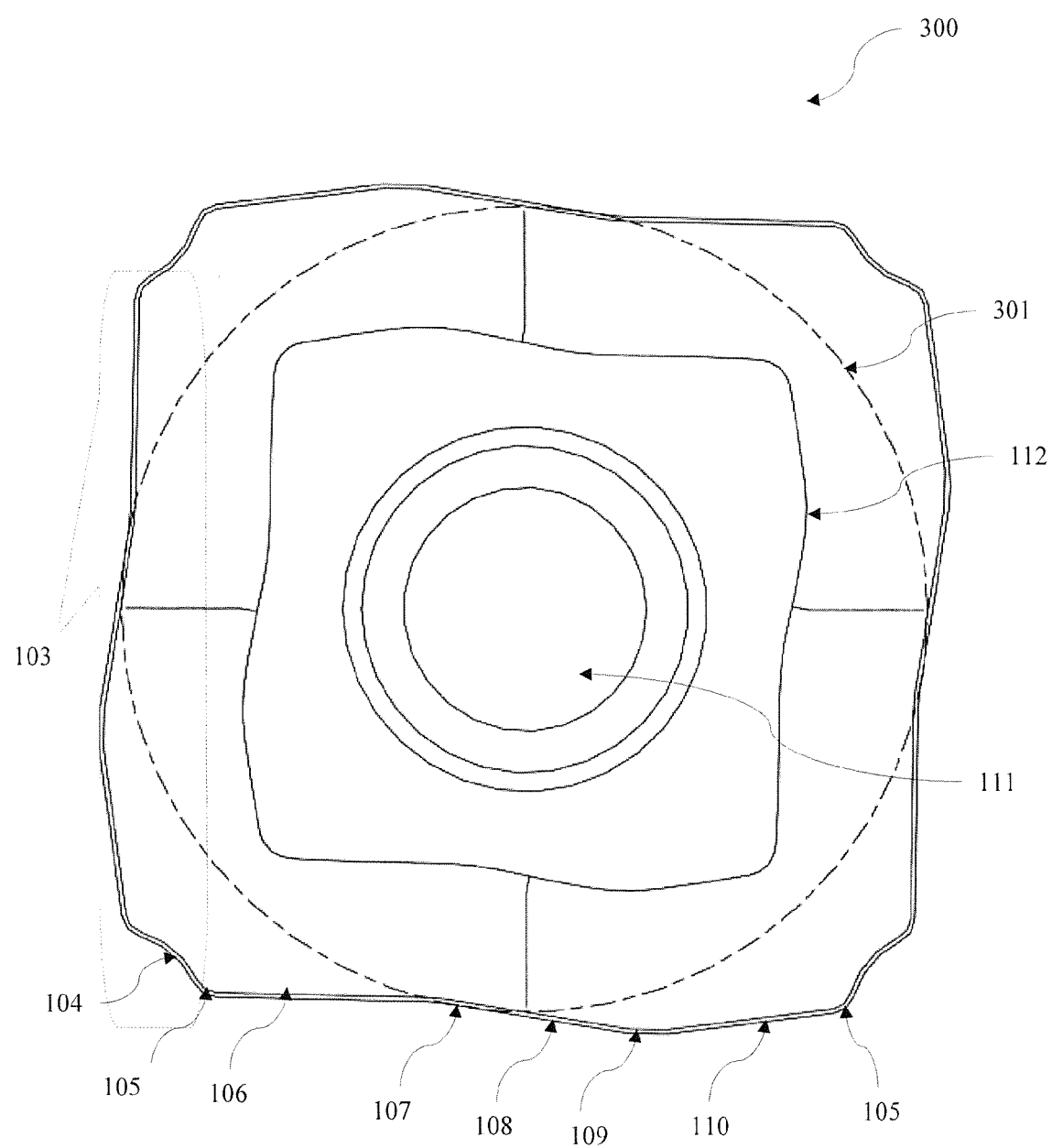
FIG. 3 illustrates a top view of the drill insert of the present disclosure.
Figure 4:
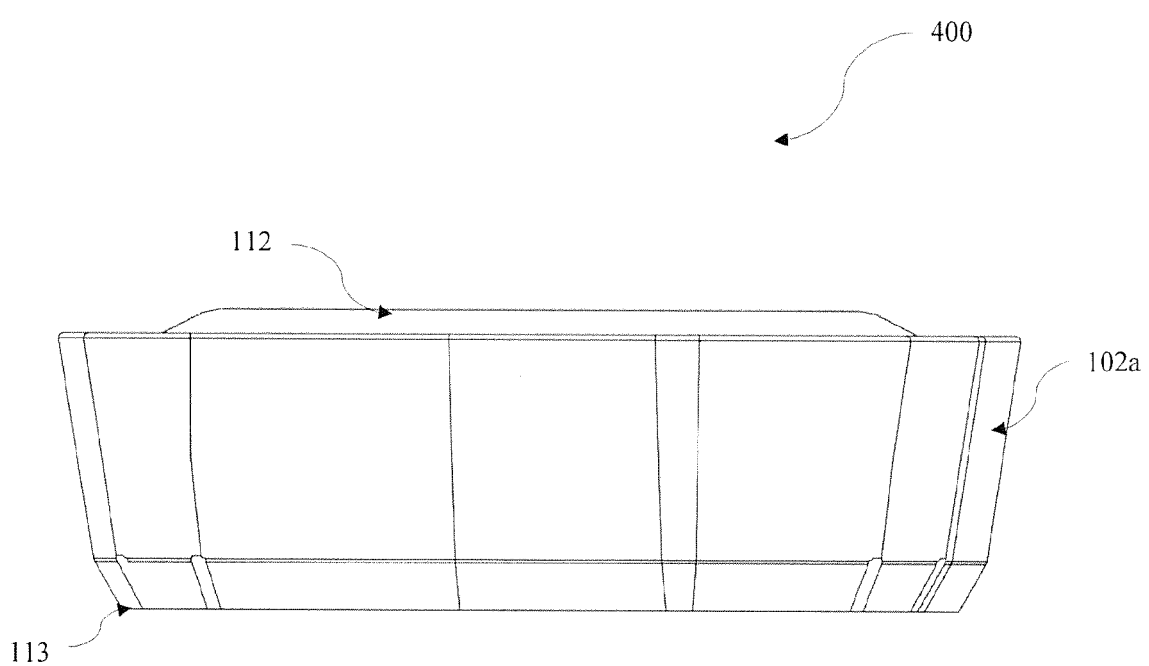
FIG. 4 illustrates a side view of the drill insert of the present disclosure.

FIG. 3 and FIG. 4 are exemplary embodiments illustrating top view and front view of the drilling insert (100). The division of cutting edges (103) into a plurality of part edges (104, 106,108 and 110) is clearly illustrated in the top view of the drilling insert (100). The concave curved part edge (104) prevents the chipping of drill insert when part of the insert crosses the drill axis (504). The part edges (106, 108 and 110) with a transition edges (107 and 109) direct the forces to centre of the drill body (502) or axis (504) of drilling, which prevents the drifting of the drill (500) from its centre. The part edges (104, 106, 108 and 110) and transition edges (107 and 109) are bound to vary in their sizes or lengths as the inscribed circle diameter (301) increases to accommodate various sizes of the inserts and hence vary proportionately as the size increases. The diameter of the inscribed circle (301) varies with respect variation in on diameter of the drill hole and is ranges from 5 mm to 20 mm.

Further, a chamfer (113) is provided at bottom edges of the drilling insert (100) towards the bottom portion (201) as shown in FIG. 4 to facilitate the secondary clearance in the insert (100). The angle of the chamfer (113) is 30° with respect to Vertical axis (A-A) of the drill insert (100) and said angle will vary with the variation in the thickness of the drill insert (100). The chamfer (113) prevents digging of the pocket (602) of the drill body (502) which in turn eliminates the wear of the pocket (602) when the drill insert (100) is in operation. The chamfer (113) also eliminates the rubbing of surface of the drill hole by the drill insert (100) when diameter of the drill hole is less than the predetermined limit.

In one embodiment, the drill insert (100) is used in the peripheral pocket (602) of the drill body (502). The corner portions (108) of the cutting edges (103) enlarge the hole which is produced by the insert in the inner pocket (602) of the drill body (502).

Figure 5:
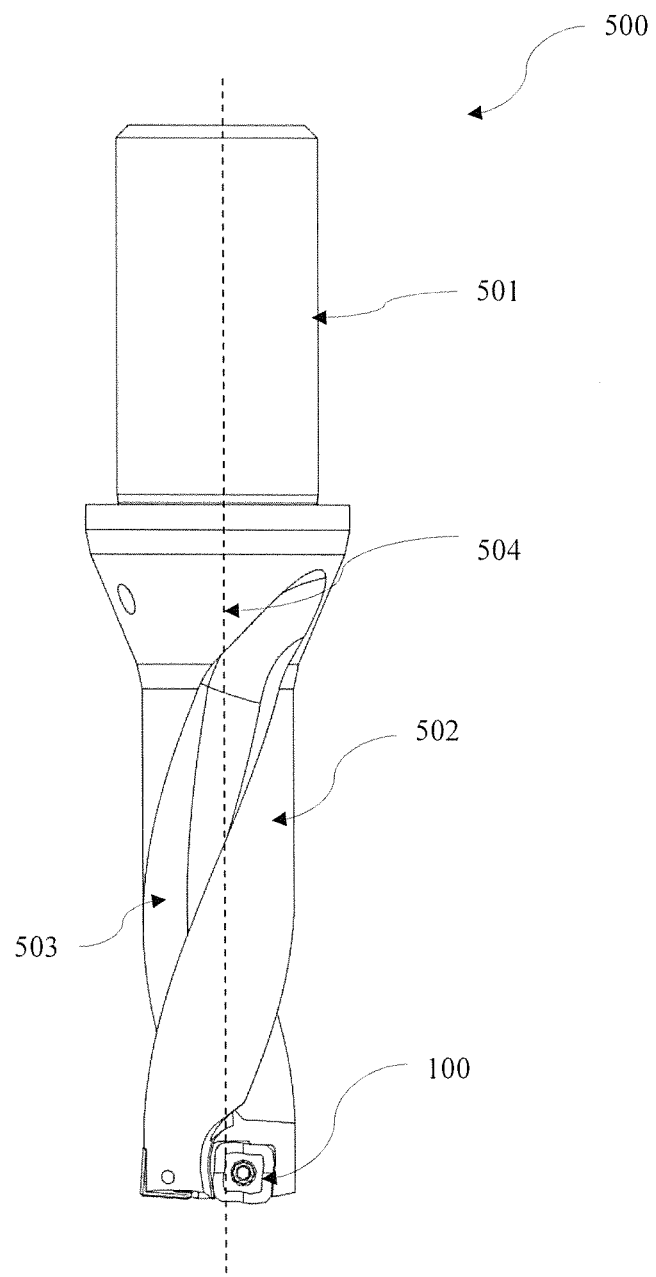
FIG. 5 illustrates a drill body having the drill insert of the present disclosure in its centre pocket and a conventional insert in its peripheral pocket.

FIG. 5 is an exemplary embodiment which illustrates the drill tool (500) having the drill insert (100) of the present disclosure in its centre pocket (602) and an insert in its peripheral pocket. The drill tool (500) includes shank (501) of predetermined length and a drill body (502) of cylindrical basic shape. The drill body (502) includes a pair of insert pockets one at its centre and other at its periphery for accommodating the drill inserts. The drill body (502) also includes helical flute (503) on its circumference for vacating the chips generated during the drilling operation. The chips generated during drilling operation are cut by the protrusion (112) of the drill insert (100) and is guided via the helical flute (503) of the drill body (502) for disposing the same. In one embodiment, an inboard insert and an outboard are positioned in the drill body (502) such that the forces generated during drilling operation are directed to the drill axis (504), which prevents the drill body (502) drifting from its centre.

In one embodiment of the present disclosure, during drilling operation, the inboard insert initially applies moderate cutting forces on to the work piece and make an initial hole on the work piece. Further, a potion of inboard drill insert (100) accommodates a corner nose portion of the outboard insert, and hence prevents use of two corners during drilling operation.

Figure 6:
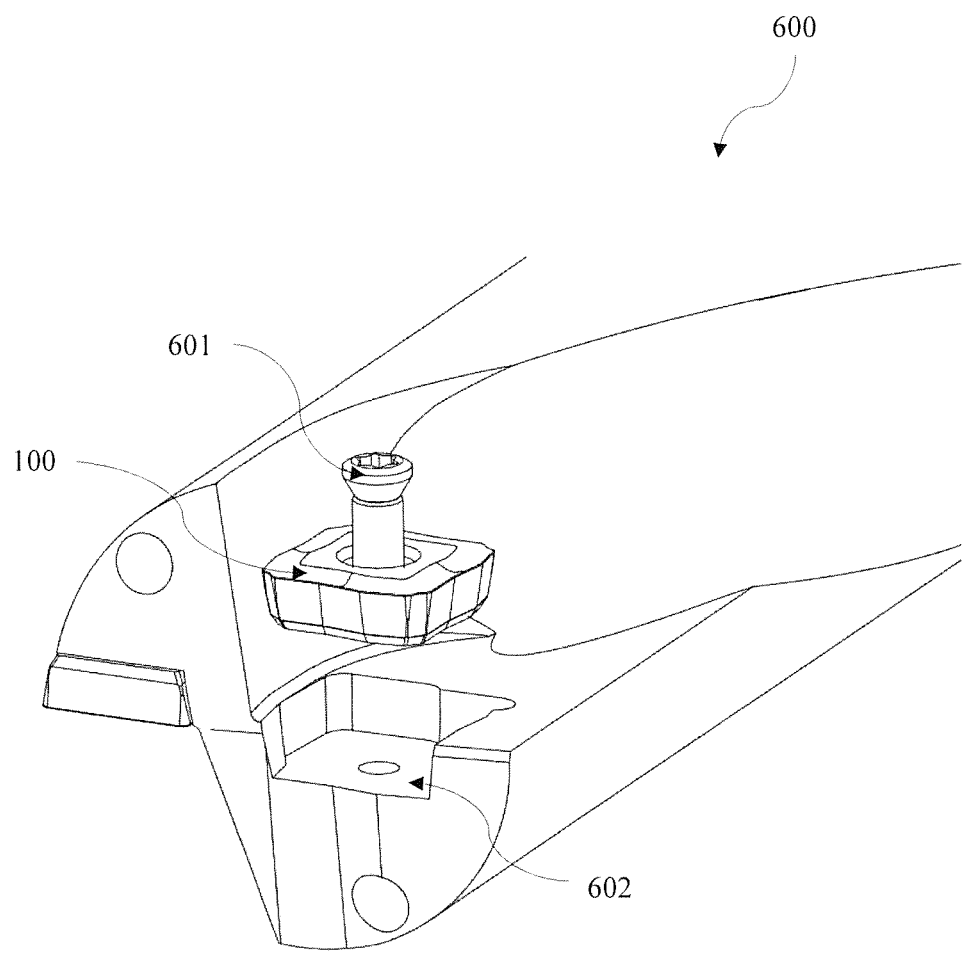
FIG. 6 illustrates a split view of drill tool having a drill insert of the present disclosure in centre pocket of the drill body.

FIG. 6 is an exemplary embodiment which illustrates a split view of drill tool (500) having a drill insert (100) of the present disclosure in centre pocket (602) of the drill body (502). The drill insert (100) is positioned in centre pocket (602) of the drill body (502). The shape of the centre pocket (602) matches with the shape of the drill insert (100). Further, the centre pocket (602) includes threaded hole for fastening the drill insert (100) with the drill body (502) using an insert screw (601). The insert screw (601) includes series of stepped portions and a threaded portion which passes through the through hole (111) of the drill insert (100) and fastens the same inside the peripheral pocket (602). Further, a conventional drill insert is mounted in peripheral pocket of the drill body (502).

Figure 7:
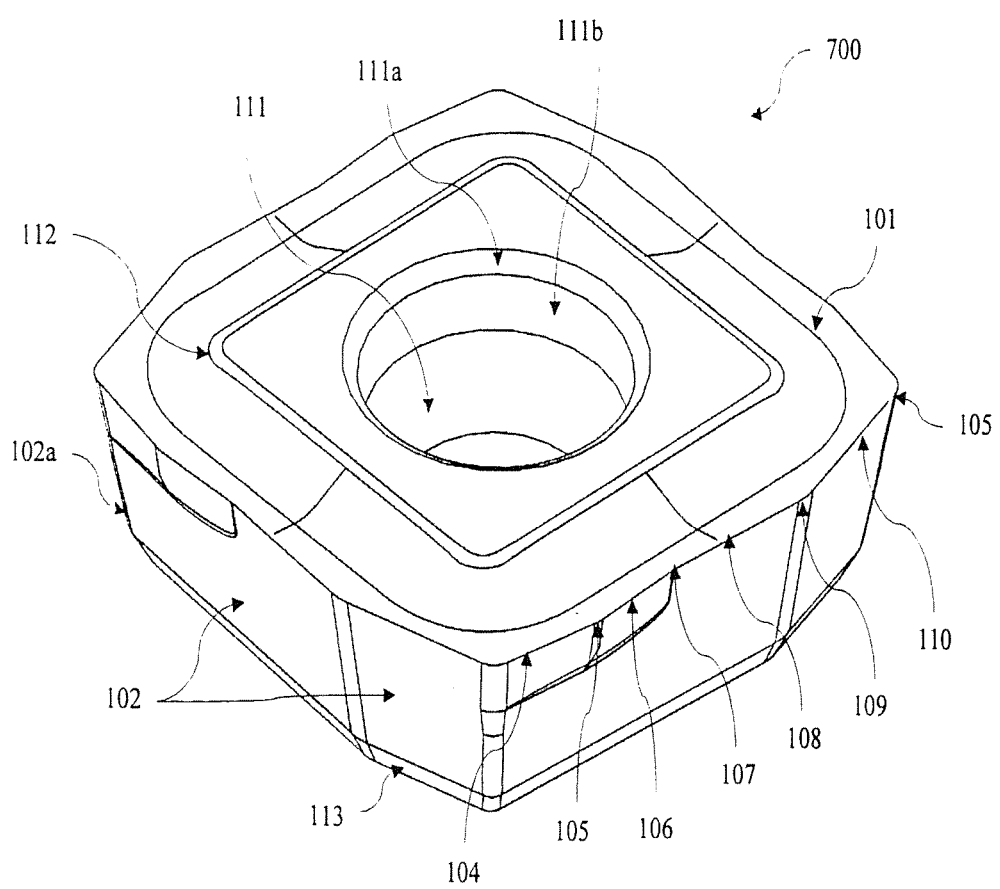
FIG. 7 illustrates a top perspective view of the drill insert as one embodiment of the present disclosure.
Figure 8:
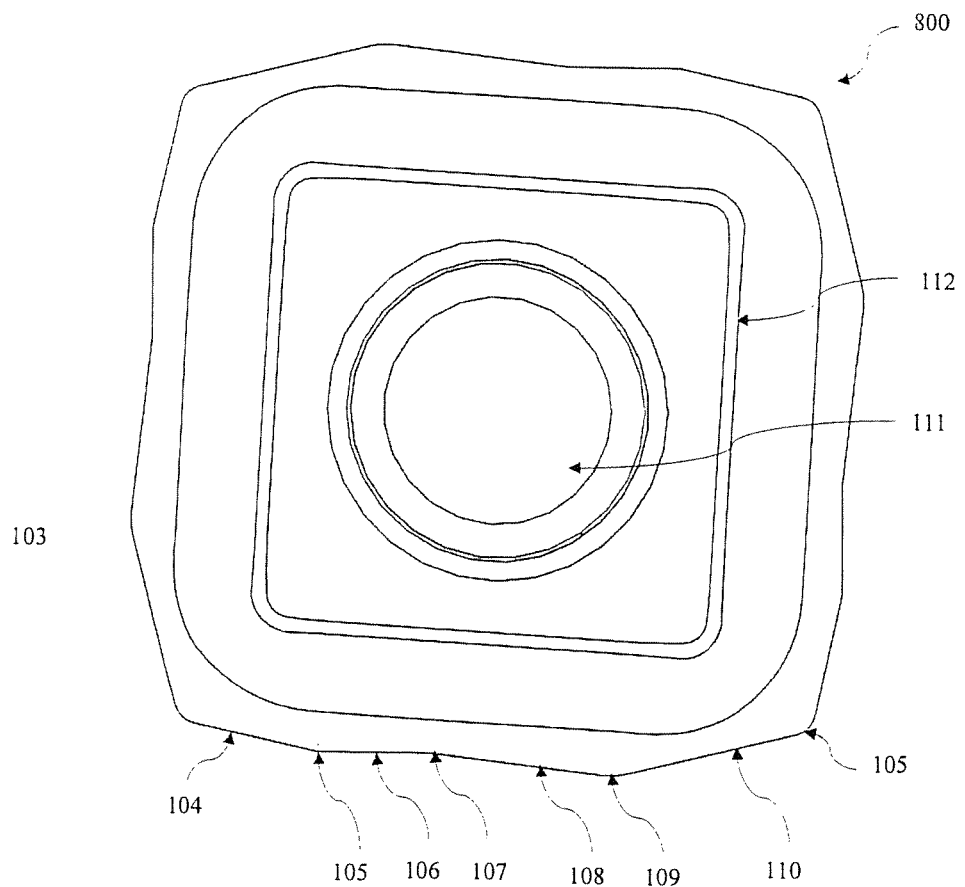
FIG. 8 illustrates a top view of the drill insert as one embodiment of the present disclosure.

As an exemplary embodiment FIGS. 7 and 8 illustrates top perspective view and top view of the drill insert. The radius of concave curved part edge 104 of the drill insert 100 varies from 0.4 to 100 mm. The radius of curved part edge is optimized to 10 mm as shown in FIG. 7, hence the concave curved part edge (104) tends to flatten out, and part edge (106) gets reduced in its length. Therefore, the corners of the side surface (102a) forms bigger curved surface.

Advantages

The present disclosure provides a quadra angular indexable drill insert in which all four cutting edges are used for drilling, i.e. when one edge wears out the subsequent edge can be used for cutting.

The present disclosure provides a quadra angular indexable drill insert which has a concave curve at four corners of the drill insert which prevents the chipping of corner portions during drilling operation, if the insert is positioned such that portion of the inset cross the drill axis.

The present disclosure provides a quadra angular indexable drill insert which has four identical cutting edges which are divided into a plurality of part edges to direct the forces to the drill axis, which eliminates the drifting of the drill from its centre.

The present disclosure provides a quadra angular indexable drill insert which has a chamfer in its bottom portion which prevents the rubbing of the drilled hole by the insert.

The present disclosure provides a quadra angular indexable drill insert which has protruded portion on its top surface to break the chip generated during the drilling process.

The present disclosure provides a quadra angular indexable drill insert which has a concave curve at four corners of the drill insert which prevents the chipping of the drill insert, when the insert is positioned such that some part of the insert crosses axis of the drill body.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

It is to be noted at this point that all of the above described components, whether alone or in any combination, are claimed as being essential to the invention, in particular the details depicted in the drawings and reference numerals in the drawings are as given below.

| Referral Numerals: | |
|---|---|
| Referral numeral | Description |
| 100 | Drill insert |
| 101 | Top surface of the insert |
| 102 | Side surface of the insert |
| 102a | Corners of the side surface |
| 103 | Cutting edge |
| 104 | Concave curved part edge |
| 105 | Convex nose portions |
| 106 | First part edges |
| 107 | Concave transition curve |
| 108 | Second part edge |
| 109 | Convex shaped part edge |
| 110 | Third part edge |
| 111 | Through hole |
| 111a | Mouth portion of the through hole |
| 111b | Stepped portions of through hole |
| 112 | Protruded portion |
| 113 | Chamfer |
| 201 | Bottom surface |
| 301 | Imaginary inscribed circle |
| 500 | Drill tool |
| 501 | Shank of the drill tool |
| 502 | Drill body |

-continued

| Referral Numerals: | |
|---|---|
| Referral numeral | Description |
| 503 | Helical flute |
| 504 | Drill axis |
| 601 | Insert screw |
| 602 | Centre pocket |
| A-A | Vertical axis of the drill insert |
| B-B | Horizontal axis of the drill insert |

I claim:

1. A quadrangular indexable drill insert comprising:
a top surface;
a bottom surface smaller than the top surface;
a side surface adjoining the top surface and the bottom surface to form four sides of the drill insert;
four identical cutting edges formed at intersections of the side surface and the top surface, each cutting edge comprising:
a concave curved part edge of a first predetermined radius at a corner of the insert;
a first part edge connected to the concave curved part edge through a first nose portion of a second predetermined radius forming a convex curve;
a second part edge connected to the first part edge through a first transitional edge, the second part edge being tangentially oriented to an imaginary inscribed circle of the insert, wherein the first transitional edge forms a concave curve with the first part edge and the second part edge;
a third part edge connected to the second part edge through a second transitional edge, wherein the second transitional edge forms a convex curve with the second part edge and the third part edge; and
a second nose portion of a third predetermined radius adjoining the third part edge with the concave curved part edge of an adjoining cutting edge;
a through hole disposed at a center of the drill insert extending between the top surface and the bottom surface, the through hole being structured for mounting the insert with a drill body; and
a chamfer provided at a bottom edge of the drill insert.

2. The drill insert of claim 1, wherein the first predetermined radius is in the range of from about 0.4 mm to about 100 mm.

3. The drill insert of claim 1, wherein the first part edge is linear and is inclined at an angle ranging from about 0° to about 5° with respect to a horizontal reference axis of the insert.

4. The drill insert of claim 1, wherein the second part edge and the third part edge generally form a 'V' shape and the angle between the second part edge and the third part edge is in the range of from about 140° to about 179°.

5. The drill insert of claim 1, wherein each of the second predetermined radius and the third predetermined radius are in the range of from about 0.1 mm to about 10 mm.

6. The drill insert of claim 1, wherein the concave curve formed by the first transitional edge has a predetermined radius in the range of from about 0.1 mm to about 5 mm.

7. The drill insert of claim 1, wherein the second transitional edge has a predetermined radius in the range of from about 0.1 mm to about 10 mm.

8. The drill insert of claim 1, wherein the through hole comprises a mouth portion and a series of stepped portions structured to accommodate an insert screw.

9. The drill insert of claim 1, wherein the chamfer is disposed at an angle of about 30° with respect to a vertical axis of the drill insert.

10. The drill insert of claim 1, wherein the top surface comprises a protruded potion around the mouth portion.

11. The drill insert of claim 1, wherein the side surface of the insert is disposed at an angle in the range of from about 0° to about 15° with respect to a vertical axis of the drill insert.

12. A drilling tool comprising:
   a drill body having a first end adapted to be coupled to a machine tool for rotating the body about a central longitudinal axis and an opposite second end having a pocket formed therein; and
   the drill insert of claim 1 disposed in the pocket such that one of the four identical cutting edges is structured to perform cutting operations on a workpiece.

13. The drilling tool of claim 12 wherein the center pocket is disposed about the central longitudinal axis.

14. The drilling tool of claim 12 wherein the first part edge of the drill insert is disposed in the drill body such that the first part edge of the one cutting edge of the four identical cutting edges is positioned radially inward from the third part edge of the one cutting edge.

15. The drilling tool of claim 14 wherein the drill insert is secured in the center pocket via an insert screw.

16. The drilling tool of claim 14 wherein the drill body further comprises a peripheral pocket having another cutting insert disposed therein.

* * * * *